Nov. 17, 1953

H. O. STREHL 2,659,362

FOOD WARMING MEANS

Filed Oct. 5, 1951

Inventor:
Henry O. Strehl
By Jones, Jesch & Darbo
Attys

Patented Nov. 17, 1953

2,659,362

UNITED STATES PATENT OFFICE 2,659,362

FOOD WARMING MEANS

Henry O. Strehl, Chicago, Ill.

Application October 5, 1951, Serial No. 249,987

2 Claims. (Cl. 126—390)

This invention relates to improvements in food warming means more particularly for use in restaurants and the like where foods are kept warm in crocks or other containers supported in a steam table.

The invention is of marked utility for the purpose of keeping a mass of mashed potato, for example, in a uniformly warm, soft, and fluffy condition.

According to prior practices, a mass of previously cooked and prepared mashed potato is kept in a container removably mounted in the steam table and closed by a cover or a lid, the container being disposed over a gas burner, for example, disposed beneath the table and adapted to heat the latter together with a pool of hot water lying in the table and from which steam or water vapor may rise about the container. The greatest amount of heat is thus applied at the bottom of the container with the disadvantageous result that the food mass is unevenly heated and the lower portion thereof tends to become stiff or even objectionably overcooked.

The present invention aims to provide means which equalizes the heat in the container adjacent the top and bottom regions thereof, and to provide such means in simple, economical form which may be readily manufactured in quantities at a minimum cost. In one aspect, the invention provides such means in the form of a simple but efficient accessory which may be readily associated with ordinary crocks or containers now in use, while in another aspect the invention may be provided in a unitary form pre-associated with a container for the purpose and forming a permanent part thereof.

These and other objects and advantages will be apparent from the following description, taken together with the accompanying drawings, of an illustrative embodiment of the invention, and in which drawings—

Figure 1:
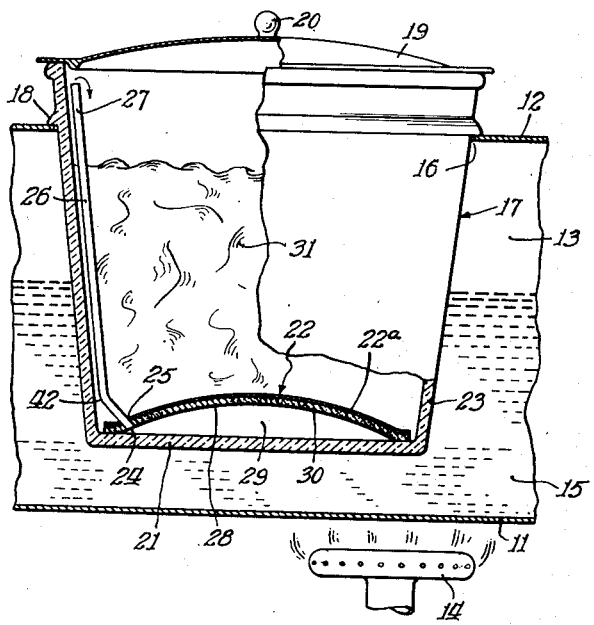
Fig. 1 is a vertical sectional view of a steam table supporting a food warming container to which the present invention is shown applied, the container being shown partly in section and partly in elevation.
Figure 2:
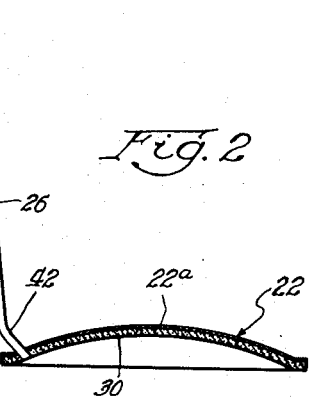
Fig. 2 is an elevational view of one embodiment of the invention separated from the container.

Referring in detail to the illustrative construction shown in the drawings, the numeral 11 indicates the lower panel and the numeral 12 the upper panel of a conventional steam table commonly used in restaurants and embracing an enclosure 13 which may be heated by a gas burner 14 or other source of heat. A quantity of water 15 may lie in the table and which is raised in temperature sufficiently to give off steam or water vapor. The upper panel 12 of the steam table may have a number of openings such as 16, only one of which is here shown, for the reception of a food containing crock or other container 17. Commonly, such container may be made of earthenware and have an annular shoulder 18 adjacent its upper end for supporting it on the table panel 12 within the opening 16 so that the lower part and bulk of the container is within the heated space 13 between the panels 11 and 12 of the table, and, commonly, lying in the hot water 15. The container 17 is desirably closed by a cover or lid 19 which may have a handle 20.

Containers such as 17 are adapted to hold food, such as, for example, a mass of previously cooked and prepared mashed potatoes, in warm and appetizing condition ready for quick service.

Figure 3:
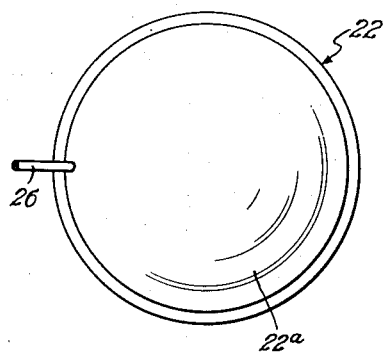
Fig. 3 is a plan view of the structure shown in Fig. 2.

In accordance with the present invention, there is shown disposed in the container 17 overlying the container bottom wall 21 a device 22 comprising an upwardly recessed member 22a, in this instance shown of metal and somewhat in the form of a concavo-convex plate or inverted dish. The member 22a is here shown advantageously circular, as best seen in Fig. 3, since the side wall 23 of the container 17 is somewhat cylindrical, and of a diameter to fit loosely within the container on its bottom wall 21 and generally cover this bottom wall, with the concave face of the member 22a down.

The member 22a being upwardly recessed, or, in this instance, being concave on its underside as at 28, thus provides an air space 29 between the member 22a and the bottom wall 21 of the container 17. As here shown, the member 22a on its under or concave face carries a layer 30 of material of low heat conductive properties or low thermal conductivity, such as asbestos.

Further in accordance with the present invention, the member 22a is generally imperforate, but has an aperture 24, preferably adjacent a margin of the member, in which is snugly received, as by a force fit, the lower end 25 of a pipe 26, the upper end 27 of which is open. The pipe is thus supported to extend upwardly along the side wall of the container 17.

The device 22 being inserted in the container 17, plate part 22a forms somewhat of a false bottom for the container, and a mass of mashed potatoes 31, for example, can be disposed in the container lying on the plate 22a and extending upwardly in the container to a point somewhere below the upper end of the pipe 26. The pipe upper end is below the container cover.

The bottom wall 21 of the container receives the greatest amount of heat, while the upper regions of the container wall receive somewhat less amounts of heat. Without the device 22 of the present invention, the mashed potatoes that would otherwise lie directly on the bottom wall 21 of the container, would be overheated. With the use of the present invention and the provision thereby of the air space 29 between the bottom wall of the container and the food itself, air in the space 29 absorbs the excess heat, and this heated air in the space 29, as it is heated and expands, may rise therefrom through the pipe 26 from the open upper end of which it may enter the space within the container above the mass of food 31 therein, thus equalizing the heat in the lower and upper regions of the container respectively, by providing communication therebetween.

As at present advised, as the air in the space 29 is heated it expands and cools, thus decreasing the pressure in the space 29 which may cause, at intervals, a suction effect therein that will draw air downwardly through th tube 26. Thus the air in the space 29 is replenished to be again heated, expanded and driven upwardly through the tube 26 and into the space above the food. Thus something in the nature of a breathing action may occur which causes a repeated cycle of operation while the container is subjected to heat in the steam table. In the construction of Fig. 1, also, since the fit of the member 22 in the container is not air tight, some air or moisture from the interior of the container may desirably seep into the space 29.

Some of the heat received from the burner 14 will pass directly through the bottom wall 21, air in the space 29 and plate 22a to the food adjacent thereto. Since the inverted plate part 22a of the member 22 may be of metal, the lining or layer 28 of asbestos or the like reduces the amount of heat which passes from the air in the space 29, directly through the plate 22a to the food within the container, further equalizing the heat in the container. It has been found that the beneficial effect of the device may continue for as long a period as eight hours or more, during which the mashed potatoes, for example, are kept in a uniform, appetizing condition throughout.

Instead of the metal plate part 22a lined with asbestos, the member 22a might be made of porcelain, glass or plastic. When made of metal it is preferably of aluminum or stainless steel, and so lined.

Figure 4:
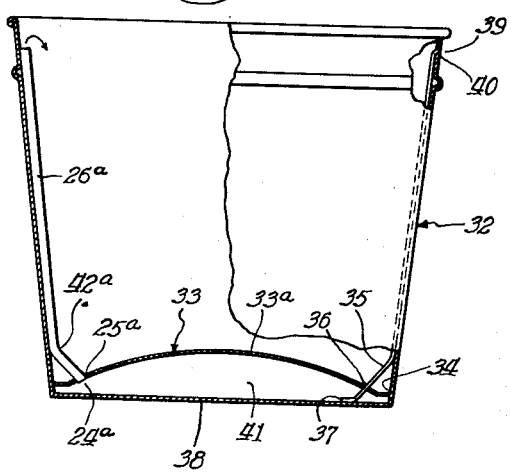
Fig. 4 is a view of a container, partly in elevation and partly in section, including the device of the present invention as a unitary part thereof.

As shown in Fig. 4, as an alternative to making the device a separate insert, the entire container 32 and device 33 might be made as a unitary article of manufacture, in which both the container and the device may be formed of aluminum or stainless steel with the margins of the plate part 33a welded, for example, permanently and hermetically in the interior of the container 32, as indicted at 34.

In this modified form shown in Fig. 4, an air intake tube 35 may be employed extending along the side of the container and at its lower end passing through a perforation 36 in the member 33. The tube 35 is preferably of smaller diameter than the pipe 26a and has its lower open end 37 lying along the bottom wall 38 of the container. The open upper end of the pipe 35, as at 39, opens to the exterior of the container through an outlet 40 in the side wall of the container which would be above the upper panel 12 of the steam table when the container is used therewith. In this construction, air may pass downwardly through the tube 35 into the space 41 between the bottom wall 38 of the container 32 and the device 33, to replenish the air therein. Thus continuous passage of heat upwardly through the pipe 26a may be provided, dispensing with the breathing action which may occur in the construction shown in Fig. 1. Since the pipe 26a is of larger diameter than the tube 35 and terminates at its lower end above the lower termination of the tube 35 the heated air in the space 41 will pass upwardly through the pipe 26a rather than through the tube 35, and will thus be directed into the space within the container above the food level and below the cover or lid of the container. At the same time the food in the container lying immediately over the member 33a will be kept from over-cooking.

In the structure of Fig. 4, the asbestos layer might be omitted.

In either case, the pipe 26 or 26a desirably extends along the side wall of the container so as to minimize interference between it and the food disposed in the container. To bring the lower end 25 or 25a of the pipe well into communication with the space 29 or 41, spaced above the container bottom wall, the pipe may have a bend or elbow 42 or 42a close to its lower end. In Fig. 4, the pipe may be brazed to the container side.

It will be understood that foods other than mashed potatoes may be advantageously dealt with by the invention, for example, green beans, chili, goulash, beef stew, etc.

The invention is not intended to be limited to details of the constructions shown for purposes of illustration and such changes may be made as are found within the scope of the appended claims without departing therefrom.

Invention is claimed as follows:

1. In food warming means for use with a covered container for food adapted to be placed within the influence of a source of heat, that improvement comprising, an upwardly recessed member disposed interiorly of the container and overlying the bottom wall thereof, said member providing an air space between itself and the container bottom wall, a pipe communicating with said air space and extending upwardly from the member adjacent the side wall of the container, said pipe at its upper end opening into the space in said container above the normal food level therein and below the cover for the container, and a second pipe communicating with said air space and opening to the outside of the container adjacent the top of the container below the cover.

2. In food warming means for use with a covered container for food adapted to be placed above a source of heat, said container having a bottom wall, that improvement comprising a generally imperforate secondary bottom member disposed interiorly of the container and overlying the bottom wall thereof, said member providing an air space between itself and the container bottom wall, a passageway communicating with said air space and extending upwardly of the secondary bottom member, said passageway at its upper end opening into the space in said container above the normal food level therein and below the cover for the container, and a conduit communicating with said air space and opening to the outside of the container.

HENRY O. STREHL.

References Cited in the file of this patent

UNITED STATES PATENTS

| Number | Name | Date |
|---|---|---|
| 175,710 | Jones | Apr. 4, 1876 |
| 560,116 | Watrous | May 12, 1896 |
| 824,119 | Howland | June 26, 1906 |
| 867,598 | Rahm | Oct. 8, 1907 |
| 1,089,664 | Osada | Mar. 10, 1914 |
| 1,336,869 | Timosci | Apr. 13, 1920 |
| 1,445,788 | Millican | Feb. 20, 1923 |
| 2,142,800 | Olexsy | Jan. 3, 1939 |
| 2,411,675 | Alexander | Nov. 26, 1946 |

FOREIGN PATENTS

| Number | Country | Date |
|---|---|---|
| 810,738 | France | Jan. 6, 1937 |